United States Patent [19]
Myers

[11] 3,840,122
[45] Oct. 8, 1974

[54] FILTER CLOTH EDGE STRIP
[75] Inventor: James R. Myers, Galveston, Tex.
[73] Assignee: GAF Corporation, New York, N.Y.
[22] Filed: Aug. 10, 1972
[21] Appl. No.: 279,730

[52] U.S. Cl............ 210/400, 162/DIG. 1, 210/DIG. 3
[51] Int. Cl............................................. B01d 33/04
[58] Field of Search.............. 210/400, 401, DIG. 3; 162/DIG. 1; 55/351, 354

[56] References Cited
UNITED STATES PATENTS
660,027   10/1900   Proctor ............................ 210/400
3,143,502  8/1964   Krynski ........................... 210/401
3,642,142  2/1972   Barnebl ........................... 210/401

Primary Examiner—Theodore A. Granger
Attorney, Agent, or Firm—Walter C. Kehm; Samson B. Leavitt

[57] ABSTRACT

An edge strip assembly suitable for use with a flat bed filter having a core member surrounded and fixedly attached to two or more layers of filter media which in turn may have an outer covering of strong durable material, such as suitable plastic. The overall assembly is joined together to form an edge strip portion which is adapted to maintain the filter bed in a predefined position throughout its operation. Suitable fastening means are integral with the edge strip portion to allow for the joining of additional lengths of filter material.

9 Claims, 3 Drawing Figures

FILTER CLOTH EDGE STRIP

The present invention is directed to an edge strip structure that is employed in conjunction with a continuous flat bed filter. More particularly, to filters emplaced in a frame or edge strip that are incorporated in a filtration apparatus adapted to travel along a predetermined path in a line of operation.

In processing various chemicals, especially in the refining of petrochemicals, as well as in the manufacture of hard chemicals, there often is need to filter out solid particles from material being treated. When employing flat bed filters a tracking portion or edge strip is required in order to insure for the correct orientation and rate of travel of the filter media with respect to other machine elements with which it may be coacting with. In a typical operation, the edge strip is placed about the periphery of the filter and in turn is engaged by a series of rollers at the edge portion to enable the filter to be drawn along in the apparatus as the process is carried out. The ends of the filter cloth are usually fastened together by suitable means, such that multiple lengths of filtering material when joined together provide a continuous filtering surface or filter belt. From the above, it is quite apparent that the edge strip when employed in conjunction with such filtering material is readily adapted to properly track and prevent the filter from bunching up or in any way inhibiting the processing of raw material at the center of the filter bed.

Up until the present invention, it has been commonplace to employ edge strip materials which were made of rubber, such as Isoprene. It follows, that the use of rubber in materials of this type, presented a number of serious disadvantages, which made it apparent that need for improvement had to be found. For example, that use of such rubber was found to be very expensive when compared to other suitable materials. More important, the rubber in nornal use, has a limited life and a tendency to wear out before the actual filter material had been spent. Next followed the laborious process of the replacement of such edge materials necessitating expensive apparatus downtime. Furthermore, replacement of such edge materials during the useful life of the filter, gave rise to the need for developing the instant invention.

Such rubber edge strip assemblies were constructed in a manner that brought the rubber portion into continuous contact with the moving parts of the apparatus, and failure resulted. More frequently, such rubber gave way in areas of stress as it is being moved along in the operation of the filter bed.

Accordingly, it is the main object of the present invention to provide for a new and useful edge material which would be free of defects of the prior art.

A further object of the present invention is to provide a filter edge material which would not exhibit any failure prior to the end of the useful life of the filter media.

Still another object of the present invention is to provide an edge material that is able to stand more stress than the filter cloth itself.

Still another object of the present invention is to provide an edge material which is less expensive than the prior art and is easy to manufacture when compared thereto.

Among the significant features of the present invention is a flat bed filter media having two or more working surfaces including: an edge portion provided with a core member in fixed relation with said working surfaces, adapted to flexibly engage driving means used to move said flat bed media along a predetermined path of travel.

Briefly stated, there is provided an edge strip assembly suitable for use with a flat bed filter comprising, a core member disposed above two or more layers of felt filter media members, an external cover member surrounding the outer layer of said filter media; said assembly being joined near the edge to form a unitary edge strip member having filter surfaces extending therefrom to a prescribed length; said edge member defining a discrete longitudinal area adapted to overcome opposing stress forces developed by such edge portion coacting with filter media transport means to advance said filter media; and fastening means joined to said edge strip assembly adapted to join one or more ends of filter media lengths to enable formation of a continuous flat bed filter media of any prescribed length.

The construction and method of operation of the invention, however, together with additional objects and advantages thereof will be best understood from the following description of specific embodiments when read in connection with the figures of the accompanying drawings showing the invention.

Figure 1:
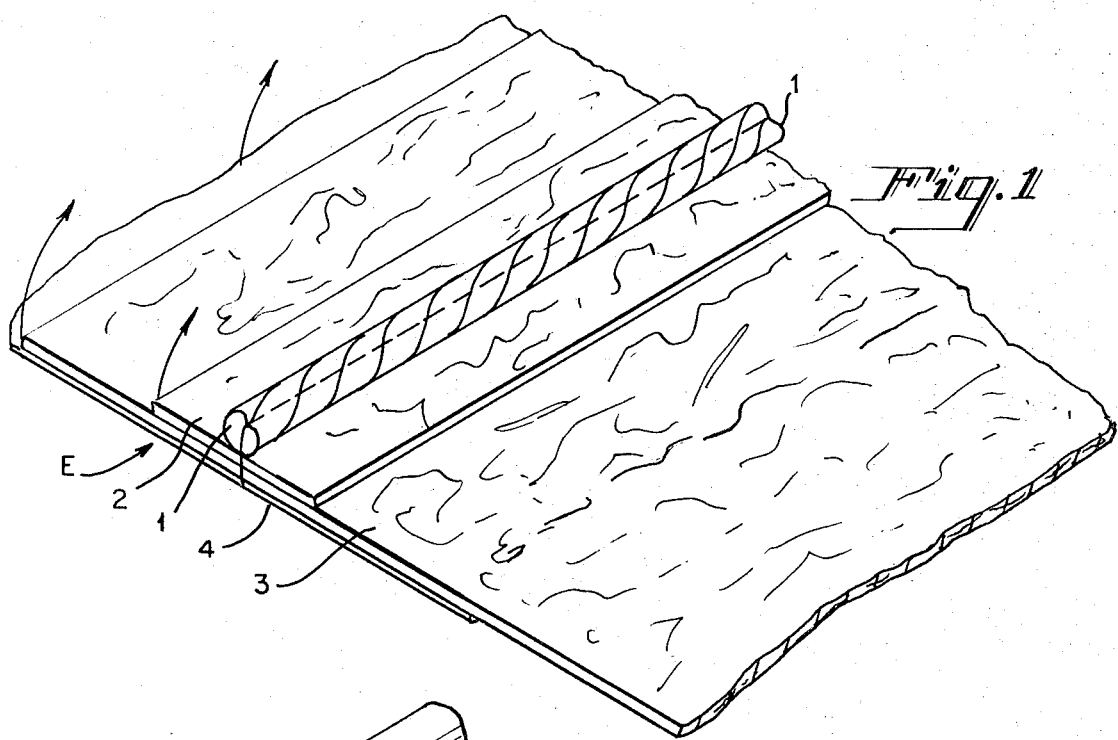
FIG. 1 is a schematic representation of the invention prior to fabrication of the edge strip.

According to the present invention the edge strip E comprises an elongated core 1, such as a nylon rope, or cotton polypropylene hemp, which is disposed on top of and fastened between several layers of polypropylene felt 2 and 3. To add rigidity and stiffness to the entire edge strip E, the polypropylene felt is glazed on one side. Subsequently, the entire arrangement of the core 1 together with the lengths of felt material 2 and 3 is placed upon a plastic material 4; such as hypalon, which acts as the outer covering for the entire assembly. Next, the felt layers 2 and 3, as well as rope 1 and covering 4, are joined to one another by sewing, gluing or other suitable means, such that the core 1 is firmly positioned with respect to the other members, to thereby form a strong and firm edge strip, having a tough outer covering. This is best seen from FIG. 2.

Figure 2:
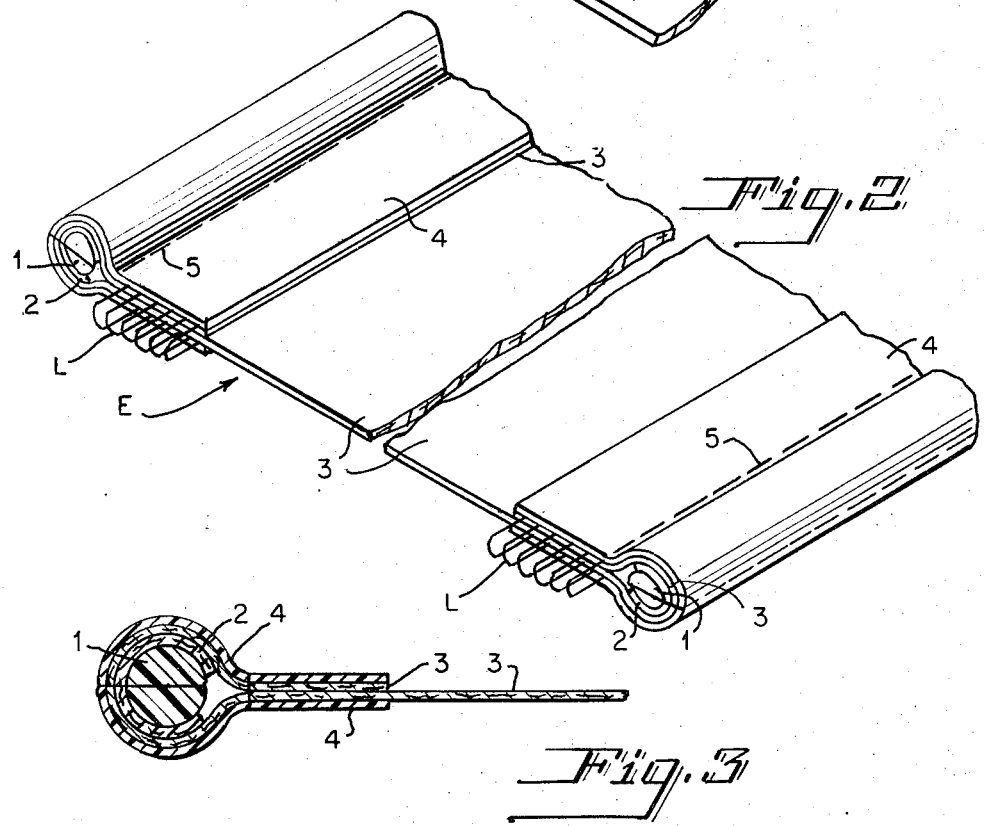
FIG. 2 is a perspective view of the filter and edge material of the present invention.

The arrangement, shown in FIG. 2, is subsequently folded over and a clipper lace L of suitable length, is fixedly attached to the respective ends of the filter media by crimping or adhesion. The clipper, once fastened to the filter media, is also embedded in the cover 4. The lace L consists of a series of teeth which are adapted to engage suitable counterparts in other lengths of filter media. By engaging such lace L, the filter media can be elongated to any desired length. Obviously, the reverse is true, too, and the lengths can be disengaged when necessary. Such lace L remains steadfast under operating conditions, even in the presence of edge strip stress, and represents a substantial improvement over prior art edge member construction. The amount of clipper lace L to be attached to the filter media depends on the designed length required to form a continuous length filter, this usually being dictated by the process.

Figure 3:
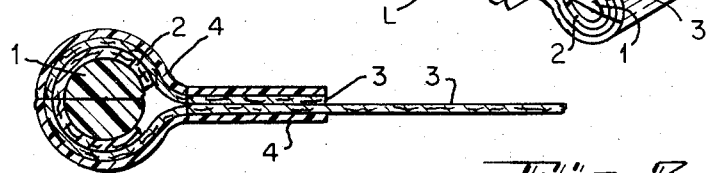
FIG. 3 is a cross-sectional view of the invention as fabricated according to FIG. 1.

The edge strip E in FIG. 3 illustrates exactly how the various components shown in FIGS. 1 and 2 are fitted together. The cross section of the edge strip E is illustrated in FIG. 3. This view clearly points out how the core portion 1, for example, the nylon rope, forms the nucleus about which the felt layers 2 and 3, as well as the outer covering 4 are combined to form a stiff and durable edge portion. The diameter of the core portion can vary depending upon the tracking and filter media parameters, however, three-eighths of an inch has been found to be satisfactory.

A variation of the aforementioned design can include an edge strip without outer cover 4. However, the use of an outer cover 4 is usually required where specific operating applications result in excessive wear on the edge strips E. For most applications, no addition reinforcement, such as reinforcing canvass, is required on the top surface.

The economics experienced in the selection of and construction as mentioned above when compared to previous edge material assemblies, represents a substantial saving. For example, everything else being constant, for a given size of edge material, the cost associated in producing same was $9.00 per unit length (including the cost of at least one replacement of filter material and edge material due to strip failure). This figure when compared to a cost of only $2.00 when employing the present invention, clearly illustrates a principal advantage of the newly discovered edge strip.

A representative size of finished product is about 15 inches wide by 63 feet long and can be varied (by the addition of added filter sections) depending upon the applications involved.

A typically sized arrangement making use of the present invention can be:

a. nylon rope three-eighths inch in diameter;
b. 15 oz. polypropylene felt length with a polypropylene grid glazed on one side only; and
c. hypalon covering material 15 inches wide.

The edge strip filter media combination has been successfully used in applications having filter bed travel rates varying from 10 ft/min to 50 ft/min at operating temperatures of from 20° to 200° F. Though at times the rate of travel has been as little as 0.200 ft/min.

It will be understood that certain changes may be made in the construction or arrangement of the instant invention which is disclosed herein without departing from the spirit and scope of the invention as defined in the appended claims.

I claim:

1. An edge strip assembly for a filter belt of the type utilized in a continuous filtration system having transport means adapted to movably advance said filter belt, comprising, in combination, a first layer of felt filter medium defining said filter belt; a second layer of felt filter medium in the form of an elongated strip disposed above and extending along the first layer of filter medium substantially adjacent one edge thereof; a flexible elongated core member disposed above the second layer of filter medium and extending along the length thereof; said first and second layers of filter media being formed in a loop surrounding said core and fixedly securing the same in place; an external plastic cover member surrounding the loop formed by the first and second layers of filter media and fixedly joined to said first layer of filter medium to form a unitary edge strip adapted to operatively engage the transport means of the continuous filtration system; and fastening means attached to the leading edge of the first layer of filter medium adapted to join said first layer of filter medium to additional sections of filter medium to extend the length of the filter belt defined thereby.

2. An edge strip assembly as claimed in claim 1, wherein said core member is nylon rope.

3. An edge strip assembly as claimed in claim 1, wherein said core member is polypropylene hemp.

4. An edge strip assembly as claimed in claim 1, wherein the first layer of filter medium and the cover member are sewn together.

5. An edge strip assembly as claimed in claim 1, wherein the first layer of filter medium and the cover member are glued together.

6. An edge strip assembly as claimed in claim 1, wherein said fastening means are glued or crimped to a portion of the edge strip assembly.

7. An edge strip assembly as claimed in claim 1, wherein said fastening means is in the form of a series of lace clips adapted to join with corresponding fastening means.

8. A flat bed filter media as claimed in claim 1, wherein said core is about three-eighths inch in diameter.

9. An edge strip assembly as claimed in claim 1, further comprising an additional second layer of felt filter medium in the form of an elongated strip disposed above and extending along the first layer of filter medium substantially adjacent a second edge thereof; a second flexible elongated core member disposed above the additional second layer of filter medium and extending along the length thereof; said first layer of filter medium and said additional second layer of filter medium being formed in a loop surrounding said second core member and fixedly securing the same in place; and an additional external cover member surrounding the loop formed by the first layer of filter medium and the additional second layer of filter medium and fixedly joined to said first layer to form a second unitary edge strip adapted to engage the transport means of the continuous filtration system.

* * * * *